(12) United States Patent
Marchesseault et al.

(10) Patent No.: US 8,147,963 B2
(45) Date of Patent: Apr. 3, 2012

(54) SYNTHETIC ICE APPARATUS AND METHOD

(75) Inventors: Jules Laurence Marchesseault, Campbell, CA (US); Terri Lynn Marchesseault, Campbell, CA (US)

(73) Assignee: Off-Belay, LLC, Campbell, CA (US)

( * ) Notice: Subject to any disclaimer, the term of this patent is extended or adjusted under 35 U.S.C. 154(b) by 556 days.

(21) Appl. No.: 12/337,548

(22) Filed: Dec. 17, 2008

(65) Prior Publication Data

US 2009/0155602 A1 Jun. 18, 2009

Related U.S. Application Data

(60) Provisional application No. 61/014,625, filed on Dec. 18, 2007.

(51) Int. Cl.
*B32B 9/04* (2006.01)
(52) U.S. Cl. ............... 428/411.1; 428/423.1; 428/424.8; 156/61
(58) Field of Classification Search ............... 428/423.1, 428/424.8, 411.1; 156/61
See application file for complete search history.

(56) References Cited

U.S. PATENT DOCUMENTS

| | | | | |
|---|---|---|---|---|
| 5,125,877 | A | 6/1992 | Brewer | 482/7 |
| 6,074,327 | A | 6/2000 | Franklin | 482/35 |
| 6,419,610 | B1 | 7/2002 | Jonas et al. | 482/35 |
| 6,551,215 | B1 | 4/2003 | Gordon | 482/35 |
| 7,056,266 | B2 | 6/2006 | Sudeith | 482/37 |
| 2005/0192160 | A1 | 9/2005 | Sudeith et al. | 482/37 |
| 2007/0191188 | A1 | 8/2007 | Collins | 482/35 |
| 2007/0205053 | A1 | 9/2007 | Isham et al. | 182/207 |

FOREIGN PATENT DOCUMENTS

WO 2006/096860 9/2006

OTHER PUBLICATIONS

Written Opinion and Search Report from PCT Application No. PCT/US08/13919 mailed on Feb. 11, 2009.
International Report from PCT Application No. PCT/US2008/013919 mailed on Jul. 1, 2010.
"Tradgirl Climbing FAQ—Ice Climbing," http://www.tradgirl.com/climbing_faq/ice_climbing.htm.
"Indoor Ice Climbing Walls and Gyms," http://www.indoorclimbing.com/iceclimbing.html.
"The Ice Factors ice climbing course and rock climbing walls," http://www.ice-factor.co.uk.
"The Saab Ice Wall, London—Vertical Chill London Ice Climbing Wall," http://www.vertical-chill.com/vertical-chill-london.htm.
"Vertical Chill Indoor Ice Climbing Wall at The North Face Manchester Store, England, UK," http://www.vertical-chill.com/vertical-chill-manchester.htm.
"$O_2$ World—Greetings," http://www.o2o2.co.kr.
"Hukawai Glacier Centre, Franz Josef Glacier, indoor ice climbing," http://www.hukawai.co.nz.
"The Ice Pit, Ice Climb in Wisconsin, USA," http://wwvv.theicepit.org/.
"powerplant climbing gym," http://users.penn.com/~petro/power.html.
"Welcome to Upper Limits Online!" http://www.upperlimits.com.

*Primary Examiner* — Thao T. Tran
(74) *Attorney, Agent, or Firm* — Zilka-Kotab, PC

(57) ABSTRACT

A synthetic ice apparatus and method are provided. In one embodiment, a first layer is molded utilizing a mold of a natural ice form. Additionally, a second layer is coupled to the first layer for providing a rigid backing to the first layer. In another embodiment, a layer is molded utilizing a mold of a natural ice form, where such layer is of a predetermined thickness for providing rigidity.

17 Claims, 4 Drawing Sheets

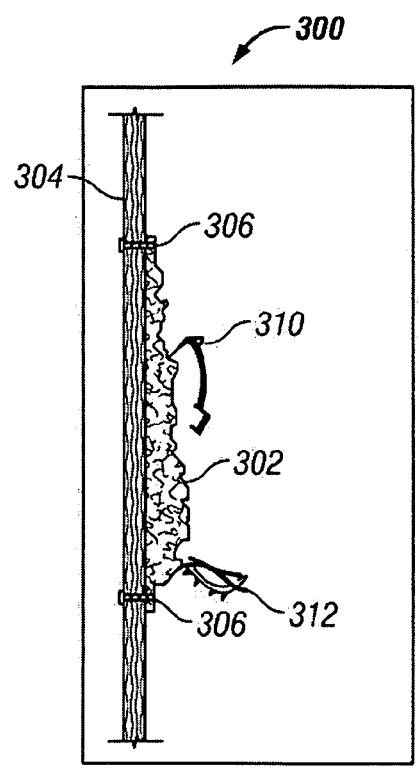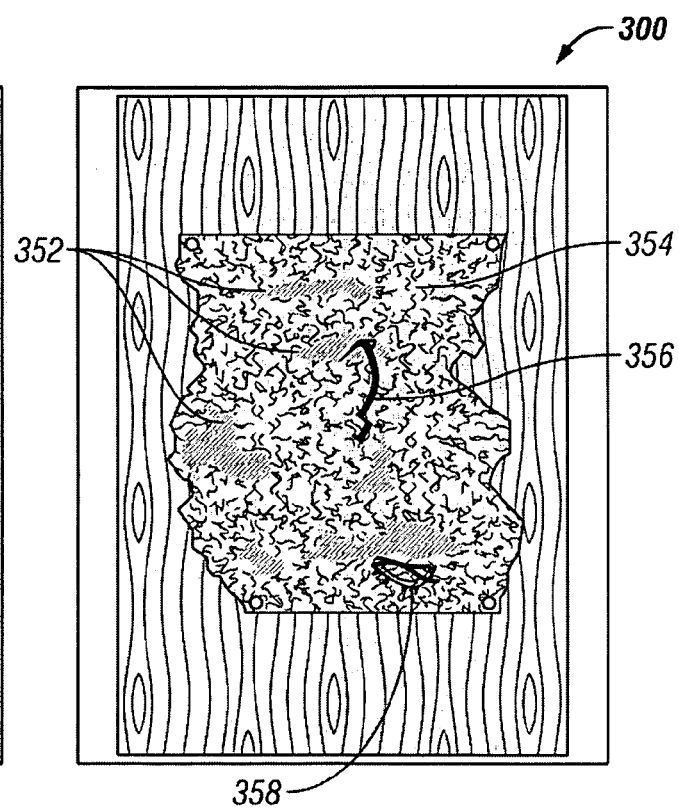
FIG. 3A                    FIG. 3B

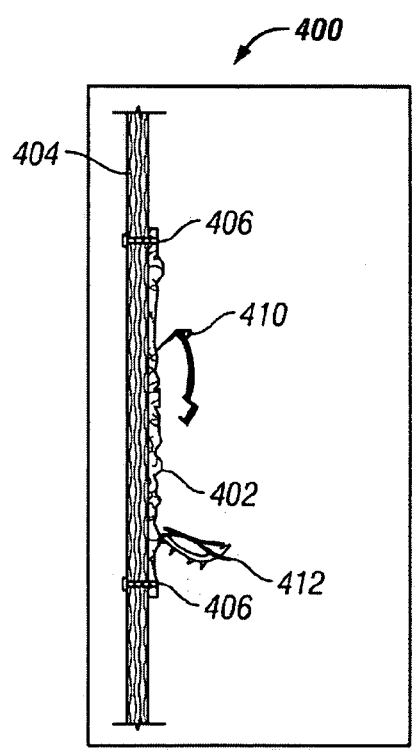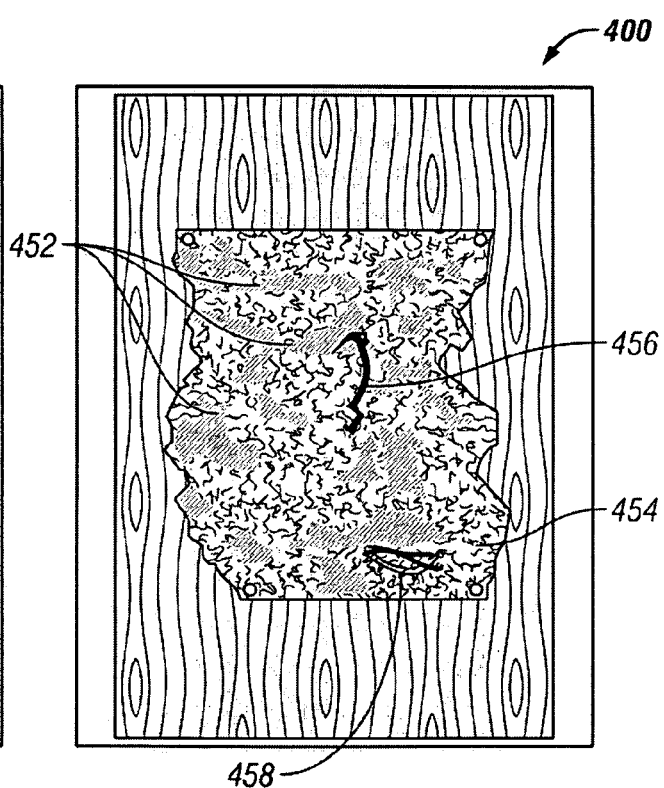
FIG. 4A
FIG. 4B

SYNTHETIC ICE APPARATUS AND METHOD

RELATED APPLICATION(S)

The present application claims priority to U.S. Provisional Patent Application No. 61/014,625, entitled "Synthetic Ice System and Method," and filed Dec. 18, 2007.

FIELD OF THE INVENTION

The present invention relates to a climbing apparatus, and more particularly to a simulated natural climbing apparatus.

BACKGROUND

Traditionally, natural climbing apparatuses have been simulated for providing an environment in which a man-made imitated apparatus may be climbed. Unfortunately, these simulated natural climbing apparatuses have generally exhibited various limitations.

For example, imitation rock has been provided for simulating natural rock (e.g. see U.S. Pat. No. 5,125,877) capable of being utilized for rock climbing activities. The imitation rock has provided rock climbing enthusiasts with the opportunity to simulate natural rock climbing activity at an easily accessible location, which is quite often indoors. The imitation rock is normally attached to a wall using a single bolt or threaded rod. However, such imitation rock has been limited to forms emulating rock surfaces.

As another example, ice climbing apparatuses have been provided for simulating natural ice formations capable of being utilized for ice climbing activities. One type of these conventional ice climbing apparatuses has included vertical refrigeration units over which water is allowed to slowly dribble for creating an ice flow. One such indoor ice climbing venue is offered by EXELEMENT™ (http://www.exelement.com). Venues providing this type of ice climbing apparatus have unfortunately been costly due to the need to establish and maintain a refrigerated environment. Additionally, climber safety has also been of concern, as portions of ice situated on the ice climbing apparatus can be dislodged during climbing and can fall onto other climbers below.

Another type of conventional ice climbing apparatuses has included ice climbing walls made of closed cell foam, also known as STYROFOAM™ (e.g. see http://www.lpaconline.com/climbing.html). However, ice climbing walls made of STYROFOAM™ generally offer no variation of surface texture, hardness, or shape, thereby limiting the simulation of natural ice climbing. Additionally, ice tools placed in the STYROFOAM™ are customarily removed by torquing the tools from side to side, a technique which is never practiced in natural ice climbing.

There is thus a need for addressing these and/or other issues associated with the prior art.

SUMMARY

A synthetic ice apparatus and method are provided. In one embodiment, a first layer is molded utilizing a mold of a natural ice form. Additionally, a second layer is coupled to the first layer for providing a rigid backing to the first layer. In another embodiment, a layer is molded utilizing a mold of a natural ice form, where such is of a predetermined thickness for providing rigidity.

BRIEF DESCRIPTION OF THE DRAWINGS

FIG. 3A illustrates a profile view of a synthetic ice apparatus simulating an ice shelf, in accordance with another embodiment.

FIG. 3B illustrates a front view of the synthetic ice apparatus of FIG. 3A, in accordance with another embodiment.

FIG. 4A illustrates a profile view of a synthetic ice apparatus simulating a vertical ice hold, in accordance with yet another embodiment.

FIG. 4B illustrates a front view of the synthetic ice apparatus of FIG. 4A, in accordance with another embodiment.

DETAILED DESCRIPTION

Figure 1:
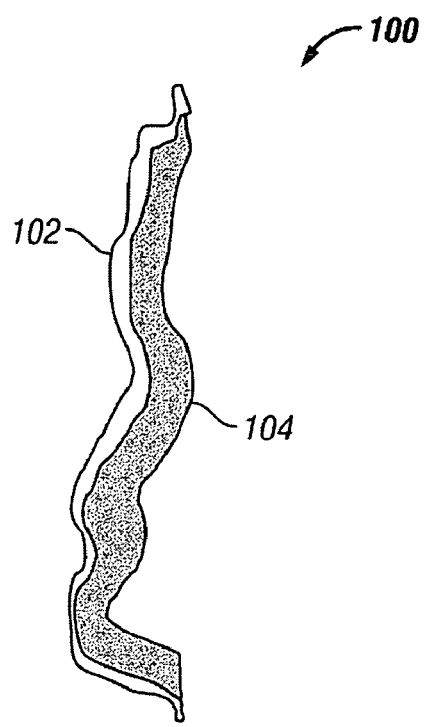
FIG. 1 illustrates a synthetic ice apparatus, in accordance with one embodiment.

FIG. 1 illustrates a synthetic ice apparatus 100, in accordance with one embodiment. As shown, the synthetic ice apparatus 100 includes a first layer 102 and a second layer 104. In the context of the present description, the first layer 102 may include a layer of any material that is molded utilizing a mold of a natural ice form.

In one embodiment, the first layer 102 may include polyethylene. For example, the first layer 102 may include low density polyethylene (LDPE). As another example, the first layer 102 may include polyethylene co-polymers (e.g. ethylene vinyl acetate, ethylene-ethyl acrylate, ethylene-methyl acrylate blends, and/or any other polymer plastic).

As an option, the first layer 102 may include a material with a shore D hardness between 17 and 48. As another option, the first layer 102 may include a thickness between 0.12 and 1.00 inches. Of course, the first layer 102 may include any desired hardness and/or thickness. For example, the first layer 102 may include a plurality of portions, each of a different hardness.

Additionally, the mold of the natural ice form that is utilized for molding the first layer 102 may include a fiberglass mold modeled after and/or generated utilizing a natural ice form (e.g. a naturally occurring ice form). In other embodiments, such mold may include any type of mold of a natural ice form capable of being utilized to mold the first layer 102 in a shape represented by the mold. While only a single mold is described herein, it should be noted that any number of molds of natural ice forms may be utilized for molding the first layer 102.

Further, in one embodiment, the first layer 102 may be molded utilizing the mold of the natural ice form by vacuum forming the first layer 102 to the mold. In another embodiment, the first layer 102 may be molded utilizing the mold of the natural ice form in a manner that is based on a material of the first layer 102. Just by way of example, the first layer 102 may be molded by vacuum forming the first layer 102 to the mold of the natural ice form if the first layer 102 includes polyethylene.

In this way, molding the first layer 102 utilizing the mold of the natural ice form may optionally result in the first layer 102 being representative of the natural ice form modeled after the mold. For example, utilizing the mold of the natural ice form in the above described manner may result in the first layer 102 having different textures (e.g. smooth, rough, etc.) and/or shapes indicative of the natural ice form.

Moreover, the second layer 104 may include a layer of any material that is capable of providing a rigid backing to the first layer 102. Just by way of example, the second layer 104 may include polyurethane, but may also include any other dense filler material, as an option.

Accordingly, the second layer 104 may include a layer of any desired thickness that is capable of providing the rigid backing to the first layer 102. In one embodiment, the second layer 104 may be of a thickness that is predetermined to provide the rigid backing. In another embodiment, the second layer 104 may include a thickness between 0.24 and 10.00 inches. In yet another embodiment, the second layer 104 may include a thickness that is two to ten times the thickness of the first layer 102.

As an option, the second layer 104 may include a plurality of portions, each of a different thickness. For example, the thickness of each of the portions may be based on a shape of the first layer 102 with which each of the portions is in contact. In one embodiment, the first layer 102 may include a plurality of protrusions of different sizes, and the thickness of various portions of the second layer 104 may be dependent on the protrusions with which such portions are in contact. Just by way of example, portions of the second layer 104 in contact with larger protrusions of the first layer 102 may be thicker than portions of the second layer 104 in contact with smaller protrusions of the first layer 102. In this way, the protrusions of the first layer 102 may be provided with varying amounts of rigidity utilizing the second layer 104.

In one embodiment, the second layer 104 may be coupled to the first layer 102 by pouring a material of the second layer 104 into a back cavity of the first layer 102. Accordingly, coupling the first layer 102 and the second layer 104 may include bonding the first layer 102 and the second layer 104. Of course, however, the second layer 104 may be coupled to the first layer 102 in any desired manner capable of providing rigidity to the first layer 102.

As an option, the synthetic ice apparatus 100 may be capable of being utilized for imitating naturally occurring ice. For example, by molding the first layer 102 utilizing the mold of the natural ice form, the synthetic ice apparatus 100 may be representative of the natural ice form. To this end, the synthetic ice apparatus 100 may be utilized by climbers for simulating ice climbing activities.

In one embodiment, the first layer 102 may be penetrable. Thus, tools (e.g. ice climbing tools) utilized by a climber to climb the synthetic ice apparatus 100 may penetrate at least the first layer 102 of the synthetic ice apparatus 100, thereby allowing the climber to simulate use of such tools when otherwise climbing naturally occurring ice forms. Optionally, such tools may include an ice-axe, crampons, etc.

In another embodiment, the second layer 104 may limit or even prevent deflection of the first layer 102 in response to an impact on the first layer 102 by any of the tools. For example, the rigid backing provided by the second layer 104 may inhibit shock absorption such that all energy from the impact of a tool may be transferred to the first layer 102, thus allowing penetration thereof. In this way, the synthetic ice apparatus 100 may emulate natural ice formations, such that climbers may utilize the synthetic ice apparatus 100 to simulate climbing of such natural ice formations.

More illustrative information will now be set forth regarding various optional architectures and features with which the foregoing synthetic ice apparatus 100 may or may not be implemented, according to the desires of the user. It should be strongly noted that the following information is set forth for illustrative purposes and should not be construed as limiting in any manner. Any of the following features may be optionally incorporated with or without the exclusion of other features described.

Figure 2:
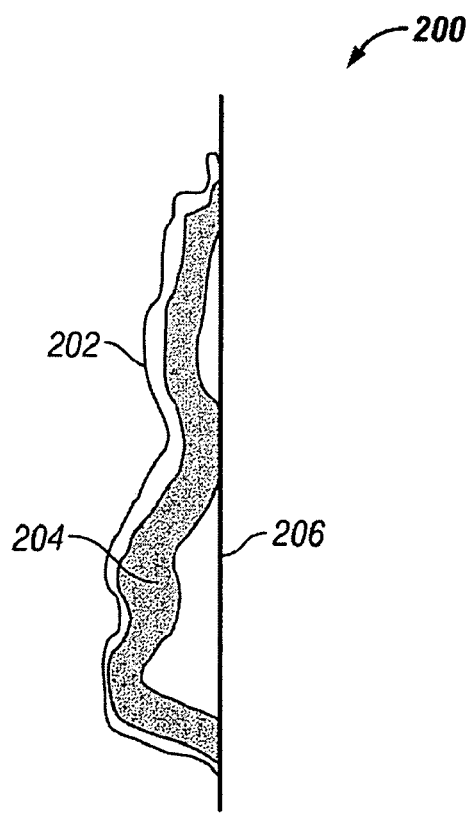
FIG. 2 illustrates an apparatus including synthetic ice coupled to a rigid backing, in accordance with another embodiment.

FIG. 2 illustrates an apparatus 200 including synthetic ice coupled to a rigid backing, in accordance with another embodiment. As an option, the apparatus 200 may be implemented in the context of the architecture and environment of FIG. 1. Of course, however, the apparatus 200 may be implemented in any desired environment. It should also be noted that the aforementioned definitions may apply during the present description.

As shown, the apparatus 200 includes a first layer 202 and a second layer 204. The first layer 202 is molded utilizing a mold of a natural ice form, and the second layer 204 is coupled to the first layer 202 for providing a rigid backing to the first layer 202. To this end, the first layer 202 and the second layer 204 may form synthetic ice.

Furthermore, the first layer 202 and the second layer 204 are coupled to a third layer 206 for providing another rigid backing to the first layer 202 and the second layer 204. The third layer 206 may include any desired type of material capable of providing a rigid backing to the first layer 202 and the second layer 204. Just by way of example, the third layer 206 may include wood, etc.

In one embodiment, the second layer 204 may be flush with the third layer 206. Further, by virtue of the coupling between the first layer 202 and the second layer 204, the first layer 202 may be indirectly coupled to the third layer 206 via the second layer 204.

In one embodiment, the first layer 202 and the second layer 204 may be coupled to the third layer 206 utilizing a plurality of fasteners. Such fasteners may include bolts, threaded rods, etc. The fasteners may secure the first layer 202 and the second layer 204 to the third layer 206 for eliminating a possibility of the first layer 202 and the second layer 204 being decoupled from the third layer 206 during use of the first layer 202 (e.g. during climbing of the apparatus 200, etc.). As an option, the fasteners may each be attached to different locations on the first layer 202 and the second layer 204 in such a manner that it may be ensured that any movement of the first layer 202 and the second layer 204 with respect to the third layer 206 is prevented during use of such first layer 202.

While only a single first layer 202 and second layer 204 are described herein it should be noted that multiple different pieces (e.g. of synthetic ice) each including the first layer 202 and the second layer 204 may be coupled to the third layer 206. For example, each of the pieces may be formed as a hold capable of being utilized by a climber for vertically climbing the third layer 206. Optionally, each of such pieces may be formed utilizing different molds of natural ice forms for providing different holds of varying size, shape, texture, and/or hardness.

In this way, synthetics ice formed via the first layer 202 and the second layer 204 may simulate natural ice-like structures for allowing climbers to utilize the synthetic ice to simulate natural ice climbing activity, in one embodiment. For example, the first layer 202 may provide textures and/or shapes representative of natural ice formations, whereas the rigidity provided by the second layer 206 may result in hardness to the synthetic ice that emulates the natural ice formations. Accordingly, a synthetic ice surface may optionally be provided which mounts to the rigid third layer 206 (e.g. climbing wall) for enabling simulated ice climbing in a controlled and non-freezing environment.

For example, the texture and hardness of at least the first layer 202 and second layer 204 may provide a surface allowing climbers to traverse the apparatus 200 upwards using ice climbing tools and techniques. Optionally, the apparatus 200 may be climbed by a climber using two hand held ice-axes and crampons secured to the climber's boots. In one embodiment, the ice-axes and crampons may be utilized by a climber for ascending at least a steep angle of, if not a vertical angle of, the apparatus 200.

Further, a basic technique of front-pointing may be used for crampon placement on the apparatus 200. Front-pointing may include kicking front crampon points into the first layer 202 of the apparatus 200 and stepping directly upon them. Front-pointing may be rhythmic and balanced, with the weight of the climber's body over the crampons and may be performed on any angle of 45 degrees or greater.

In one embodiment, the climber may swing each ice-axe overhead in a successive motion to penetrate at least the first layer 202 of the apparatus 200, or may otherwise identify features (e.g. shapes, etc.) in the first layer 202 of the apparatus 200 permitting placement of the ice-axe. At the same time, the climber may kick each foot forward to penetrate, at least the first layer 202 of the apparatus 200 with the crampons secured to the climber's boot. This activity may anchor the climber to the apparatus 200 and allow for upward progress. In this way, and as described above, the apparatus 200 may provide ice climbing enthusiasts with the opportunity to simulate ice climbing activity at an easily accessible location and in a controlled and safe environment.

It should be noted that a climber of the apparatus 200 may also employ various techniques for efficiently placing the ice axes. The objective of placing an ice axe is to establish solid placement of the pick (the sharp curved end of the ice axe) with a single well aimed swing. For example, the fewer the swings per placement, the less fatigue during navigation of the apparatus 200. While climbing, the climber may study the textures and angles of the apparatus 200 for ice axe placement opportunities.

In addition to proper technique and force used in placing the pick, a proper pick removal technique should also be utilized by the climber. In one embodiment, the pick may be removed in the reverse of the motion used to place it in the apparatus 200. In some optional embodiments, the pick should not be required to be removed by torquing it from side to side which may result in breaking the tip of the pick.

In various embodiments, the climber may look for holes, bulges or ledges in the apparatus 200 offering opportunities for optimal ice axe placement. Large synthetic icicles emulating chandelier ice that are provided by the synthetic ice of the apparatus 200 may be in clusters on vertical sections, creating slots or gaps between them that can be utilized for secure hooking of the pick. If no features exist on the apparatus 200 for the climber to hook the ice axe onto, the climber may also employ the technique of a decisive downward flick of the wrist at the end of a short swing, allowing the pick to penetrate into the apparatus 200. Both pick and crampon penetration of the apparatus 200 may require approximately ¼ inch penetration for a secure hold. Thus, in such embodiment, the first layer 202 and/or the second layer 204 should be at least ¼ inch in thickness such that the penetration is into solid (i.e. and not hollow) material.

FIG. 3A illustrates a profile view of an apparatus 300 simulating an ice shelf, in accordance with another embodiment. As an option, the apparatus 300 may be implemented in the context of the architecture and environment of FIGS. 1 and/or 2. Of course, however, the apparatus 300 may be implemented in any desired environment. It should also be noted that the aforementioned definitions may apply during the present description.

As shown, the apparatus 300 includes a synthetic ice layer 302 and a rigid backing layer 304. In one embodiment, the synthetic ice layer 302 may consist of a first layer molded utilizing a mold of a natural ice form and a rigid second layer coupled to the first layer. The synthetic ice layer 302 may be coupled to the rigid backing layer 304 via a plurality of fasteners 306, as also shown.

The apparatus 300 may be made of varying textures, shapes and hardness similar to that of real ice which determine the skill level required for a climber to maneuver on the apparatus 300. Specific textures and features (e.g. shapes) provided by the first layer 302 may be varied to adjust the level of difficulty in the climbing activity. For example, as shown, a hold 308 which simulates an ice shelf (e.g. by providing a severe protrusion) may provide a straightforward location to penetrate with an ice-axe 310 or crampon points 312.

As another example, the skill level required by the climber to maneuver the apparatus 300 may be based on a position of holds included on the apparatus 300. Optionally, the closer the holds are positioned together, the more opportunities for ice-axe 310 and crampon 312 placement as the climber traverses upward, resulting in an easier climb of the apparatus 300. However, when holds are spaced further apart, more skill and technique may be required by the climber to negotiate the apparatus 300.

Moreover, various routes may be undertaken as the climber negotiates the apparatus 300. As described above, holds may be formed via the first layer 302 to allow the penetration of an ice axe 310 or crampon points 312 so the climber may anchor himself/herself to the apparatus 300 during the course of the climb. The climber may thus select which holds to utilize for climbing the apparatus 300, resulting in various possible routes capable of being undertaken by the climber.

FIG. 3B illustrates a front view of the apparatus 300 of FIG. 3A, in accordance with another embodiment. Again, it should be noted that the aforementioned definitions may apply during the present description.

As shown, the apparatus 300 includes a plurality of different textures located on a front face thereof. For example, the front face may include an outward face of a first layer of the apparatus 300. Thus, the textures may be resultant from a mold of a natural ice form utilized to mold the first layer of the apparatus 300, and may thus represent textures of a natural ice formation.

In one embodiment, the apparatus 300 may include portions with a smooth texture 352. The smooth texture 352 may result in more difficulty for a climber in gripping the apparatus 300 utilizing an ice-axe and/or crampon. For example, a hold including a severe protrusion (as shown in FIG. 3A) may be more easily gripped utilizing an ice axe 356 and/or crampons 358 than a hold which is vertical and nearly smooth in texture, and therefore may more likely be selected by a climber for negotiating an easier climb of the apparatus 300.

In another embodiment, the apparatus 300 may include portions with a rough texture 354. The rough texture 354 may result in less difficulty for a climber in gripping the apparatus 300 utilizing an ice axe 356 and/or crampons 358. For example, a hold which is rough in texture 354 may more easily be gripped utilizing an ice axe 356 and/or crampons 358 than a hold which is smooth in texture 302, and therefore may more likely be selected by a climber for negotiating an easier climb of the apparatus 300.

FIG. 4A illustrates a profile view of an apparatus 400 simulating a vertical ice hold, in accordance with yet another embodiment. As an option, the apparatus 400 may be implemented in the context of the architecture and environment of FIGS. 1 and/or 2. Of course, the apparatus 400 nay be implemented in any desired environment. It should also be noted that the aforementioned definitions may apply during the present description.

As shown, the apparatus 400 includes a synthetic ice layer 402 and a rigid backing layer 404. In one embodiment, the synthetic ice layer 402 may consist of a first layer molded utilizing a mold of a natural ice form and a rigid second layer coupled to the first layer. The synthetic ice layer 402 may be coupled to the rigid backing layer 404 via a plurality of fasteners 406, as also shown.

The apparatus 400 may be made of varying textures, shapes and hardness similar to that of real ice which determines the skill level required by a climber to maneuver the apparatus 400. Specific textures and features (e.g. shapes) provided by the first layer 402 may be varied to adjust the level of difficulty in the climbing activity. For example, as shown, a hold 408 which is vertical or nearly vertical (e.g. by providing a minimal protrusion if any at all), may provide a difficult location to penetrate with an ice axe 410 and/or crampon points 412. As another example, such hold 408 may provide a limited or non-obvious location for placement of an ice axe 410 and/or crampon points 412, which may optionally require thorough investigation and skillful tool placement by a climber, and which may therefore be more difficult to negotiate by the climber.

FIG. 4B illustrates a front view of the apparatus 400 of FIG. 4A, in accordance with another embodiment. Again, it should be noted that the aforementioned definitions may apply during the present description.

As shown, the Apparatus 400 includes a plurality of different textures located on a front face thereof. For example, the front face may include an outward face of a first layer of the apparatus 400. Thus, the textures may be resultant from a mold of a natural ice form utilized to mold the first layer of the apparatus 400, and may thus represent textures of a natural ice formation.

In one embodiment, the apparatus 400 may include portions with a smooth texture 452. The smooth texture 452 may result in more difficulty for a climber in gripping the apparatus 400 utilizing an ice axe 456 and/or crampons 458. For example, a hold that is vertical (as shown in FIG. 4A) and smooth may be less easily gripped utilizing an ice axe 456 and/or crampons 458 than a hold which includes a severe protrusion and/or a rough texture, and therefore may less likely be selected by a climber for negotiating an easier climb of the apparatus 400.

In another embodiment, the apparatus 400 may include portions with a rough texture 454. The rough texture 454 may result in less difficulty for a climber in gripping the apparatus 400 utilizing an ice axe 456 and/or crampons 458. For example, a hold which is rough in texture 454 may be more easily gripped utilizing an ice axe 456 and/or crampons 458 than a hold which is smooth in texture 452, and therefore may more likely be selected by a climber for negotiating an easier climb of the apparatus 400.

Figure 5:
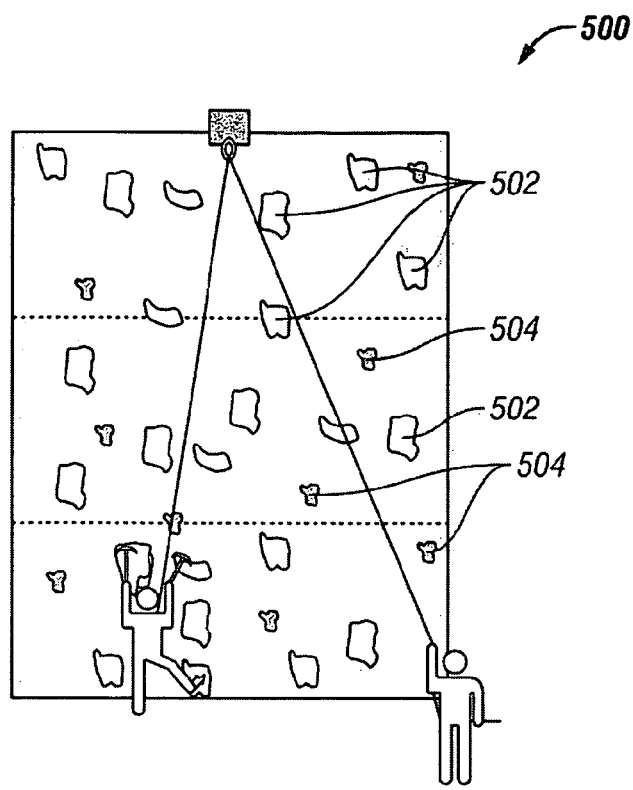
FIG. 5 illustrates a synthetic ice apparatus including a combination of synthetic ice holds and synthetic rock holds, in accordance with still yet another embodiment.

FIG. 5 illustrates an apparatus 500 including a combination of synthetic ice holds and synthetic rock holds, in accordance with still yet another embodiment. As an option, the apparatus 500 may be implemented in the context of the architecture and environment of FIGS. 1-4B. Of course the apparatus 500 may be implemented in any desired environment. Again, it should be noted that the aforementioned definitions may apply during the present description.

The apparatus 500 may provide both synthetic ice holds 502 and synthetic rock holds 504 for allowing a climber to climb the apparatus 500. The synthetic ice holds 502 may emulate natural ice formations, whereas the synthetic rock holds 504 may emulate natural rock-formations (e.g. by being formed from a mold of a natural rock formation or by being formed from a mold simulating a natural rock formation, etc.). In this way, the apparatus 500 may simulate outdoor mixed route climbing.

In one embodiment, the synthetic rock holds 504 may be interspersed amongst the synthetic ice holds 502. Accordingly, a climber climbing the apparatus 500 may be capable of utilizing ice tools for navigating the synthetic ice holds 502 and may optionally utilize a dry tooling technique for navigating the synthetic rock holds 504. Dry tooling may include a technique by which the climber wedges an ice axe in a rock crack or crevice, or hangs the ice-axe from a rock ledge to gain upward mobility.

Figure 6:
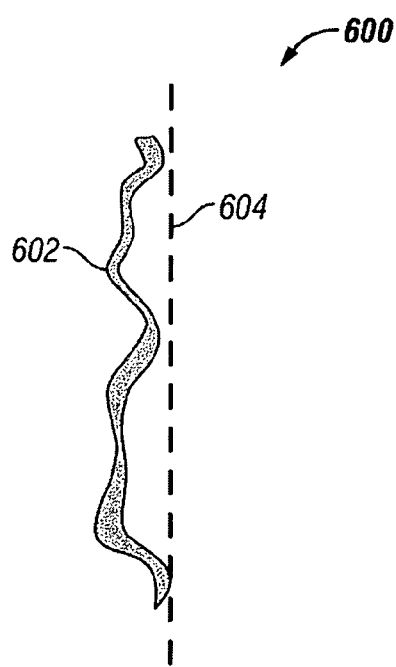
FIG. 6 illustrates a synthetic ice apparatus, in accordance with yet another embodiment.

FIG. 6 illustrates a synthetic ice apparatus 600, in accordance with yet another embodiment. As an option, the synthetic ice apparatus 600 may be implemented in the context of the architecture and environment of FIGS. 3A-5. Of course, however, the synthetic ice apparatus 600 may be implemented in any desired environment. Again, it should be noted that the aforementioned definitions may apply during the present description.

As shown, the synthetic ice apparatus 600, may include a layer 602 molded utilizing a mold of a natural ice form. Thus, the layer 602 may include a front face thereof that emulates the natural ice form. For example, the layer 602 may include a plurality of different shapes and textures for providing various types of holds capable of being utilized by a climber for climbing the synthetic ice apparatus 600.

As an option, the layer 602 may include polyethylene. For example, the layer 602 may include low density polyethylene (LDPE). As another example, the layer 602 may include polyethylene co-polymers (e.g. ethylene vinyl acetate, ethylene-ethyl acrylate, ethylene-methyl acrylate blends, and/or any other polymer, plastic). As another option, the layer 602 may include a material with a shore D hardness between 17 and 48.

With respect to the present embodiment, the layer 602 may be of a predetermined thickness for providing rigidity. The thickness may be predetermined to limit or even prevent deflection of the layer 602 in response to an impact on the layer 602 by a tool utilized for climbing the synthetic ice apparatus 600. For example, the layer 602 may be of a thickness predetermined to inhibit shock absorption such that all energy from the impact of the tool may be transferred to the layer 602, thus allowing penetration thereof. As another example, the thickness may be predetermined such that any penetration by a tool may be held within the layer 602 (e.g. may be prevented from entering a front face of the layer 602 and further exiting a back face of the layer 602).

In one embodiment, the predetermined thickness may include at least 0.25 inches. For example, the predetermined thickness may optionally be between 0.25 and 1.00 inches. Of course, the predetermined thickness may include any thickness found necessary to be sufficient for providing rigidity. In this way, the synthetic ice apparatus 600 may emulate natural ice formations, such that climbers may utilize the synthetic ice apparatus 600 to simulate climbing of such natural ice formations.

As an option, the layer 602 may be coupled to a rigid backing 604. The rigid backing 604 may include wood, for example. Further, the layer 602 may be coupled to the rigid backing 604 via a plurality of fasteners. The rigid backing 604 may optionally stabilize the layer 602 for allowing a climber to traverse the layer 602.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed:

1. A synthetic ice apparatus, comprising:
a first layer molded utilizing a mold emulating natural ice formations, wherein the first layer provides a plurality of textures representative of the natural ice formations; and
a second layer coupled to the first layer for providing a rigid backing to the first layer, wherein a rigidity of the second layer provides a plurality of degrees of hardness that emulate the natural ice formations;
wherein the first layer and the second layer form a surface penetrable by an ice climbing tool utilized by a climber to climb the synthetic ice apparatus, and the plurality of textures provided by the first layer and the plurality of degrees of hardness provided by the second layer result in a surface traversable by the climber using the ice climbing tool;
wherein the second layer is of at least one thickness predetermined for enabling the rigid backing to prevent deflection of the first layer and allow penetration of the first layer in response to an impact on the first layer by the ice climbing tool.

2. The synthetic ice apparatus of claim 1, wherein the first layer includes polyethylene.

3. The synthetic ice apparatus of claim 1, wherein the first layer includes a thickness between 0.12 and 1.00 inches.

4. The synthetic ice apparatus of claim 1, wherein the first layer includes a material with a shore D hardness between 17 and 48.

5. The synthetic ice apparatus of claim 1, wherein the first layer is molded by vacuum forming a material of the first layer to the mold emulating the natural ice formations.

6. The synthetic ice apparatus of claim 1, wherein the thickness of the second layer is between 0.24 and 10.00 inches.

7. The synthetic ice apparatus of claim 1, wherein the second layer includes polyurethane.

8. The synthetic ice apparatus of claim 1, wherein the second layer includes a plurality of portions each of a different thickness.

9. The synthetic ice apparatus of claim 8, wherein the thickness of each of the portions is based on a shape of the first layer with which each of the portions is in contact.

10. The synthetic ice apparatus of claim 1, wherein the second layer is coupled to the first layer by pouring a material of the second layer into a back cavity of the first layer.

11. The synthetic ice apparatus of claim 1, wherein the first layer includes a plurality of portions, each of a different degree of hardness.

12. The synthetic ice apparatus of claim 1, wherein the first layer and the second layer are further coupled to a third layer for providing another rigid backing to the first layer and the second layer.

13. The synthetic ice apparatus of claim 12, wherein the first layer and the second layer are coupled to the third layer utilizing a plurality of fasteners.

14. The synthetic ice apparatus of claim 13, wherein the plurality of fasteners are each attached to different locations for preventing movement of at least a portion of the first layer.

15. The synthetic ice apparatus of claim 1, wherein the surface is of a predetermined thickness such that the ice climbing tool penetrates a solid material of the surface.

16. The synthetic ice apparatus of claim 9, wherein a first subset of the portions of the second layer are in contact with a first set of protrusions of the first layer that are of a first size and a second subset of the portions of the second layer are in contact with a second set of protrusions of the first layer that are of a second size, wherein further the first size is larger than the second size, and the protrusions in the first set of protrusions are of a greater thickness than the protrusions in the second set of protrusions, such that protrusions of the first layer are provided with varying amounts of rigidity utilizing the second layer.

17. A method for generating a synthetic ice apparatus, comprising:
molding a material utilizing a mold emulating natural ice formations for generating a first layer, wherein the first layer provides a plurality of textures representative of the natural ice formations; and
coupling a second layer to the first layer for providing a rigid backing to the first layer, wherein a rigidity of the second layer provides a plurality of degrees of hardness that emulate the natural ice formations;
wherein the first layer and the second layer form a surface penetrable by an ice climbing tool utilized by a climber to climb the synthetic ice apparatus, and the plurality of textures provided by the first layer and the plurality of degrees of hardness provided by the second layer result in a surface traversable by the climber using the ice climbing tool;
wherein the second layer is of at least one thickness predetermined for enabling the rigid backing to prevent deflection of the first layer and allow penetration of the first layer in response to an impact on the first layer by the ice climbing tool.

* * * * *